May 7, 1935. H. B. HATCH 2,000,637
FRUIT COLORING ROOM
Filed April 26, 1932
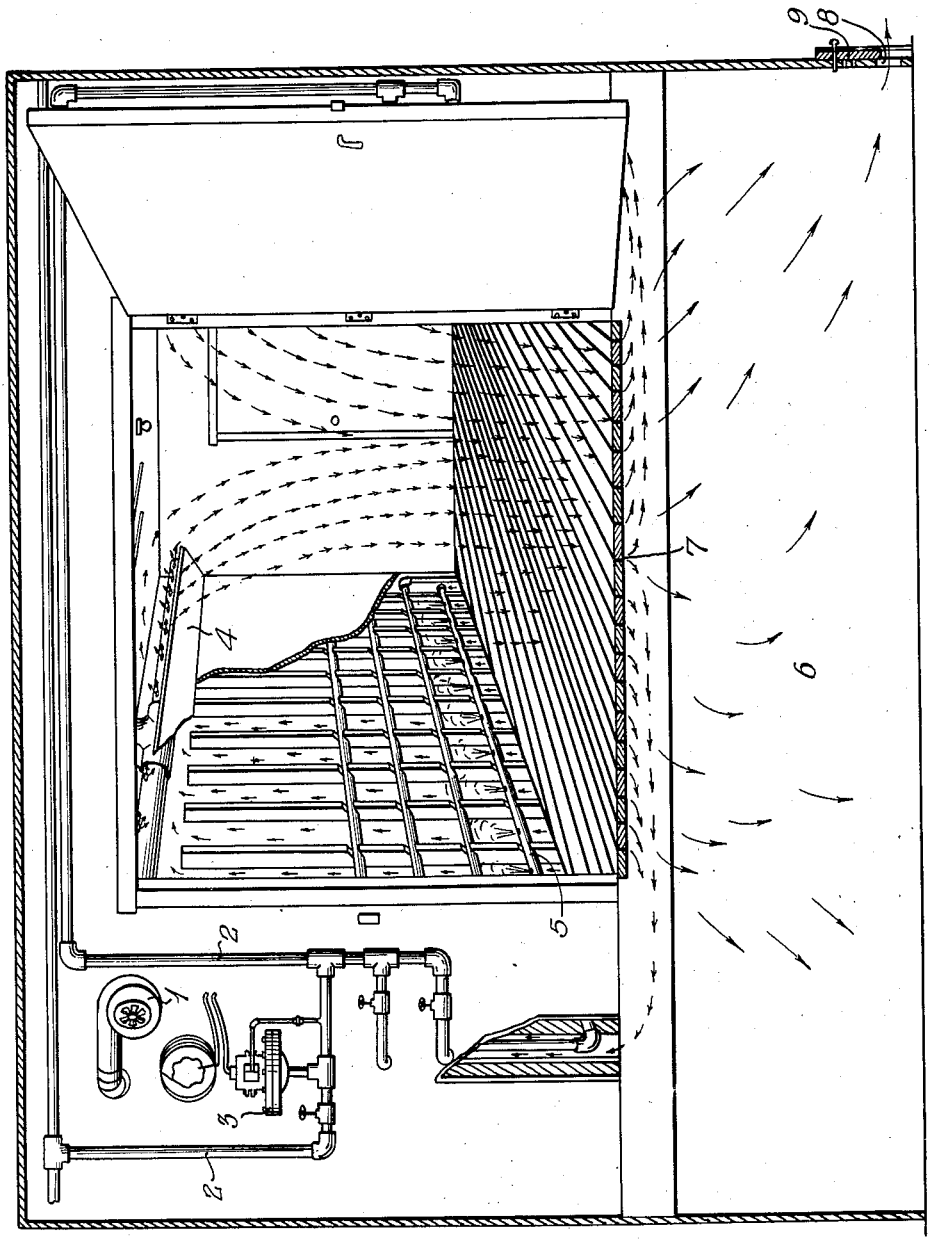
Inventor
Hugh B. Hatch.
By
Attorney

UNITED STATES PATENT OFFICE 2,000,637

FRUIT COLORING ROOM

Hugh B. Hatch, Dunedin, Fla., assignor to Food Machinery Corporation, San Jose, Calif., a corporation of Delaware Application April 26, 1932, Serial No. 607,648

5 Claims. (Cl. 99—2)

This invention relates to a method and apparatus for treating fruits of various kinds and especially refers to the coloring of all citrus fruits such as oranges, grapefruit, lemons, tangerines and many other fruits including bananas, that either normally have a green color or tend to turn green under certain temperature or climatic conditions, but which may be given a beautiful yellow or orange color through the controlled application of heat and moisture and certain gases.

A number of reasons exist which make it necessary or desirable to color fruit by means of so called coloring rooms where the coloring is done by the application of heat in the presence of proper humidity, and gases.

In the first place the buying public are not inclined to buy fruit having a green colored skin where it is thought the normally ripe fruit should be a bright orange or yellow color.

Some citrus fruits, though mature and edible may show a green coloring, which to the uninitiated seems to indicate that the fruit is not ripe, and usually such fruit will not normally change color except in contact with cold weather or by proper treatment in a coloring room.

Valencia oranges for example, which are fully ripe and show an orange color, if held late in the season will tend to turn green and start growing when warm weather comes in the spring. With this variety especially, a treatment in the coloring room brings back the natural ripe yellow to the fruit and greatly aids in the marketing of the fruit.

Many and diverse methods have been employed to effect these results through subjecting the product to heat in the presence of moisture and certain gases, but they have met with only partial success due principally to the difficulties encountered in maintaining a uniform and proper heat and moisture condition throughout the entire room at all times while the process is in operation, and to maintain a proper circulation of air so that there is a constant change throughout the entire room.

The thing paramount in a system of this kind is to establish and maintain a uniform temperature and humidity in every part of the coloring room so that the fruit near the ceiling, that near the floor, that in the corners and center of the pack receive the same treatment as to time, temperature and humidity. If this is not accomplished then the treatment will not be uniformly successful. Some of the fruit will be over treated and some under treated with after results that will affect the marketing and sale of the product.

Fruit that is to be treated is placed in the commercial field boxes and they are stacked four or five high in the room which usually almost fills the entire treating space, with of course such separation between boxes and tiers to permit a rapid and proper circulation of the air throughout the pack.

Generally considered the invention includes a specially constructed room in which the fruit to be treated is stacked in the desired formation to permit rapid and effective circulation. The room is provided with a slatted floor, the boards preferably running in a diagonal direction so as to break joints with the stacked boxes. A specially constructed room is likely to give better results, but any closed room can be used. Underneath the room a relatively large space is provided for the drainage of cold air and undesirable gases so that as the heated moist air is forced into the room the cold air and gases will quickly flow to the space below the room proper and be dissipated.

The invention disclosed by this application is an improvement on the device disclosed by co-pending application Serial No. 445,775, wherein is described in detail the various mechanism and devices for circulating and humidifying the air throughout the room, and this application can be referred to for such details of operation. This application being filed by B. C. Skinner.

This invention refers particularly to the drainage space below the slatted floor of the room proper whereby the cold air and gases emanating from the fruit may escape to permit a more perfect and uniform circulation of the air in the room proper.

A principal reason for the necessity of the sub-space under the slatted floor is that it has been found in operating these coloring rooms under the varying conditions prevailing during the picking and packing seasons that it is sometimes very difficult and unprofitable to use sufficient air under forced circulation to reach all parts of the room quickly and effectively so that all of the fruit will receive a uniform treatment. If the circulation is not uniform throughout the room there will be dead air spaces that are slow to heat, and cold places that act as a blanket to the reception of the heated air, but by providing the sub-space below the slatted floor for the drainage of the cold air and the dead air spaces it has been found that this air and the gases mentioned quickly flow into this sub-space and permit a very uniform and rapid circulation of the treating air throughout the room and in the interstices of the fruit.

Cold air is present in the fruit when packed in the coloring room because of the time of day that the fruit is picked. Where the fruit is placed in the coloring room at the time of picking, fruit that is picked and boxed early in the morning is cold on account of the cold nights which usually prevail in those sections, and then as the day progresses and the sun begins to warm the fruit, that fruit that is stored in the coloring room around noon is much warmer, so that the room is filled with fruit of varying temperatures.

Fruit as picked is at times in varying degrees of ripeness, and necessarily of different color so that when the treatment for color begins it is very desirable that all of the fruit in the room be affected at substantially the same time, because it is detrimental to ripe fruit to receive too much color treatment, so unless the green fruit begins to change color at the beginning of the treatment the ripe fruit will be overtreated before the greener fruit receives sufficient treatment. Here the sub-space under the treating room becomes very effective in permitting the cold air surrounding the morning fruit to drain quickly away and permit the heated and humidified air to come in contact with the fruit. Usually each coloring room holds from 400 to 1000 boxes of fruit, perhaps all in varying degrees of temperature so that a rapid change to the treating temperature is highly desirable.

Even where there is no blower system present the coloring will progress more rapidly and uniformly if space is provided for the drainage of the cold air and gases so that the treating atmosphere can quickly contact with the fruit.

It is known that carbon dioxide and other gases are given off by fruit under storage conditions and it has been found that these gases are more or less detrimental to the fruit if held in contact therewith for any length of time. A sub-space under the coloring room provides a space for these gases to drain quickly away from the fruit and thus removes one source of damage to the fruit.

It is known that heated air will tend to accumulate in the top of a room and with the sub-space under the treating room for the quick drainage of the cold air and gases in and about the fruit the warmer treating medium will quickly envelope all of the fruit in the room and the color treatment will be effected in the least possible time. The cold air draining away from the coldest fruit draws the warm air in behind it thereby heating the coldest fruit first so that all fruit may reach the proper temperature at approximately the same time.

It is a principal object of this invention to provide a room for coloring fruit and the like wherein a uniform and rapid circulation of treating medium may be effected.

It is also an object of the invention to provide a coloring room for fruit or the like wherein undesirable air and gases may be constantly drained away from the fruit during the treatment thereof.

It is also an object of the invention to provide a coloring room for fruit and the like wherein there is provided a sub-space underneath the room to permit undesirable air and gases to flow from the room above through the action of gravity.

It is also an object of the invention to provide a coloring room for fruit and the like wherein a treating medium may be supplied to the room under forced circulation and the displacement of the undesirable air and gases in the room be dissipated in a room adjoining the treating room thus permitting a rapid and uniform circulation of the treating medium throughout the coloring room.

It is also an object of the invention to provide a coloring room for fruit or the like wherein fruit may be confined in a room closed except at the bottom, providing a drainage space below the coloring room having a capacity of at least 15 per cent of the coloring room for the disposition of undesirable air and gases forced out of the coloring room by the entering treating medium.

It is a further object of the invention to provide circulating and humidifying mechanism for conditioning a treating medium for the coloring of fruit or the like in a substantially closed room and providing a sub-space under said room for the drainage of undesirable air and gases displaced by the treating medium during a period of coloring operation.

With such objects in view as well as other advantages which may be inherent in the invention, consisting in the parts and combinations constituting the same and which will be hereinafter claimed, it is understood that the several elements and combinations may be varied in their placement and general arrangement without departing from the scope and nature of the invention, and in order to make the invention more clearly understood, there are shown in the accompanying drawing, somewhat diagrammatically, means and mechanism for placing the same in concrete form, without limiting the improvements to the particular construction and arrangement shown.

In the drawing accompanying this specification there has been shown a commercial coloring room with the door swung open to show the interior. The blower 1, piping 2, control device 3 shown at the left of the room are the means for supplying air and moisture to the room, and the devices 4 show the manner of distributing the air into the room, and the pipe 5 shows the manner of distributing humidity to the room. This mechanism and its operation is fully described in the Skinner copending application mentioned and need not be repeated here.

The subject of this invention is the provision of the sub-space 6 underneath the coloring room into which the cold air and undesirable gases may escape when the treating medium is projected into the room through the devices 4 and 5. The slatted floor 7 permits the escape of these gases. At the lower right side of the sub-space 6 is provided a small outlet for the escape into the atmosphere of the accumulating air and gases in the space 6, this being indicated at 8.

It has been found in practice that the sub-space under the slatted floor should be at least 15 per cent of the cubical volume of the coloring room Other proportionate sizes between the coloring room and the sub-space will give satisfactory results under certain conditions so that by mentioning at least 15 per cent difference in capacity it is not intended to limit the size to these percentages.

The opening 8 being small and capable of regulation with the slide 9, the escape into the atmosphere of the air and gases in the sub-space 6 may be as rapid or as slow as may be desired. By restraining the escape through the opening 8 a blanket of cold air may be held in the space 6 which will act somewhat as an insulation and prevent a too rapid escape of the heated air from the coloring room. Also the suction side of the blower may be connected near the lower part of the coloring room to draw the treating medium away from the region of the sub-space so that the blanket of air in the space 6 will act quite effectively in forming an insulating medium. The larger the space below the coloring room, within certain limits, the better the results will be. The space, however, should not be more than 200 per cent and a space of 50 per cent is ample for excellent results, and when the space exceeds 100 per cent it begins to be wasteful. It might be said therefore that a space ranging from at least 15 per cent to 100 per cent of the size of the coloring room would give satisfactory results, and from 100 per cent to 200 per cent would give results but not as good.

Having described my invention what I claim as new and desire to secure by Letters Patent is:

1. An apparatus for coloring fruit or the like comprising a room substantially closed on the sides and top, a slatted floor for said room, a sub-space under said room for the escape of air and gases from the coloring room, said sub-space having a cubical capacity of substantially 15 per cent of the capacity of said coloring room, with blower means for projecting circulating treating medium into said coloring room near the top thereof to produce a downward movement of air therein to said sub-space.

2. An apparatus for coloring fruit or the like comprising two adjacent rooms with a slatted partition therebetween, one under the other and which has substantially 15 per cent of the cubic capacity of the other, means for projecting circulating treating medium into one of said rooms near the top thereof for the treatment of fruit stored therein by slowly passing downward through the stored fruit, the other of said rooms receiving the air and gas displaced from said first room and slowly dissipating it to the atmosphere, an exit means in said receiving room for admitting the confined air to the atmosphere, and means for adjusting the size of said exit.

3. An apparatus for coloring fruit or the like comprising a treating room and a room for receiving dissipated air and gases, a slatted partition separating said rooms, one of which is under the other, blower means for distributing a treating medium into one of said rooms to force air and gas downward therefrom into said other room, the relative cubical capacity of said room being around 15 per cent of the coloring room, with means for controlling the escape of air and gas from said room to the atmosphere.

4. An apparatus for coloring fruit or the like comprising two adjacent rooms, one having 15 per cent capacity of the other, a slatted partition between said rooms, a blower for projecting circulating air into the larger of said rooms near the top thereof and water sprays for distributing moisture with the air into the larger of said rooms, the smaller of said rooms receiving the displaced air and gas from said larger room and slowly dissipating the same to the atmosphere, with means for controlling said dissipation.

5. An apparatus for coloring fruit or the like comprising a room substantially closed on the sides and top, a slatted floor for said room, a sub-space under said room for the accumulation, and escape of air and gases from the coloring room, said sub-space having a cubical capacity of at least 15 per cent of the capacity of said coloring room, with means for distributing treating medium into said coloring room near the top thereof.

HUGH B. HATCH.